United States Patent [19]
Gerace et al.

[11] Patent Number: 6,069,225
[45] Date of Patent: May 30, 2000

[54] POLYCARBONATE COMPOSITION USEFUL IN OPTICAL STORAGE APPLICATIONS

[75] Inventors: Michael A. Gerace, Slovan; Sivaram Krishnan, Pittsburgh; James B. Johnson, Washington, all of Pa.; Jeff M. Tennant, New Cumberland, W. Va.

[73] Assignee: Bayer Corporation, Pittsburgh, Pa.

[21] Appl. No.: 09/270,860

[22] Filed: Mar. 17, 1999

[51] Int. Cl.⁷ .................................................. C08G 64/00
[52] U.S. Cl. ........................................... 528/198; 528/196
[58] Field of Search ...................... 528/196, 198

[56] References Cited

U.S. PATENT DOCUMENTS

| | | | |
|---|---|---|---|
| 4,325,863 | 4/1982 | Hinsken et al. | 624/111 |
| 4,338,244 | 7/1982 | Hinsken et al. | 524/109 |
| 4,670,479 | 6/1987 | Miyauchi | 524/154 |
| 5,175,312 | 12/1992 | Dubs et al. | 549/307 |
| 5,607,624 | 3/1997 | Nesvadba et al. | 252/589 |

*Primary Examiner*—Terressa M. Boykin
*Attorney, Agent, or Firm*—Joseph C. Gil; Aron Preis

[57] ABSTRACT

A thermoplastic polycarbonate composition suitable for the preparation of optical storage devices, for instance optical discs, is disclosed. The composition, containing a stabilizing amount of partially fatty acid ester and as a stabilizer, a compound the structure of which contains at least one benzofuran-2-one group per molecule, features improved resistance to yellowing, reduced haze and high total light transmission values.

9 Claims, No Drawings

POLYCARBONATE COMPOSITION USEFUL IN OPTICAL STORAGE APPLICATIONS

FIELD OF THE INVENTION

The invention relates to thermoplastic polycarbonate molding compositions and more particularly to molding compositions containing a stabilizer and an ester which compositions are suitable in optical storage applications.

SUMMARY OF THE DISCLOSURE

A thermoplastic polycarbonate composition suitable for the preparation of optical storage devices, for instance, optical discs, is disclosed. The composition, containing a stabilizing amount of partially fatty acid ester and as a stabilizer, a compound, the structure of which contains at least one benzofuran-2-one group per molecule, features improved resistance to yellowing, reduced haze and high total light transmission values.

TECHNOLOGICAL BACKGROUND

Polycarbonate resins are well known engineering plastics and have long been used in a large variety of applications. In recent years, these resins have been used successfully as substrates for information storage and recording applications, most notably video and audio discs. Other applications include ophthalmic lenses and the like.

Much effort has been devoted to impart water-clarity to polycarbonate substrate used in data storage applications, e.g., compact discs. It has been observed that some mold release agents that are excellent performers in all respects often impart undesirable yellowness to the molded polycarbonate article. The preparation of a molding composition suitable for the preparation of optical discs meeting the requirements of clarity and color has long been an objective of the art-skilled.

The relevant art is noted to include U.S. Pat. No. 4,670,479, which disclosed a polycarbonate composition containing organic phosphine and a partial ester of a monobasic fatty acid. The disclosed composition is said to be suitable in presently relevant applications.

U.S. Pat. Nos. 4,325,863 and 4,338,244 disclosed a benzofuranone compound useful as stabilizer for organic materials. The organic polymeric materials stabilized by this compound are said to include polycarbonates. Also relevant are U.S. Pat. Nos. 5,175,312 and 5,607,624, which disclosed 3-phenylbenzofuran-2-ones and 3-arylbenzofuranones respectively, said to be suitable as stabilizing agents for organic materials against oxidative, thermal or light induced degradation.

The present invention resides in the findings that a polycarbonate composition containing the specified ester and a stabilizing compound having at least one benzofuran-2-one group in its molecular structure is particularly suitable for the preparation of optical storage devices having attractive optical properties.

DETAILED DESCRIPTION OF THE INVENTION

The thermoplastic composition in accordance with the present invention comprises (i) thermoplastic polycarbonate resin,
(ii) about 0.01 to 1.0, preferably about 0.01 to 0.5 percent, of a partial fatty acid ester, and
(iii) about 0.01 to 0.5, preferably about 0.01 to 0.2, percent of a compound characterized in that its molecular structure features at least one benzofuran-2-one group per molecule, said percents being relative to the total weight of (i), (ii) and (iii).

Suitable polycarbonate resins for preparing the copolymer of the present invention are homopolycarbonates and copolycarbonates and mixtures thereof.

The polycarbonates generally have a weight average molecular weight of 10,000 to 200,000, preferably 15,000 to 22,000, and their melt flow rate, per ASTM D-1238 at 300° C., is about 1 to about 95 g/10 min., preferably about 60 to 90 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

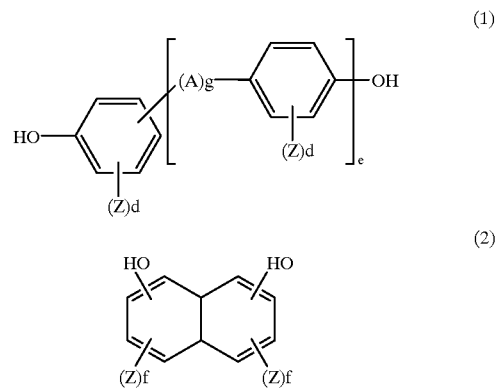

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —$SO_2$ or a radical conforming to

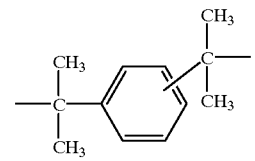

e and g both denote the number 0 to 1;
Z denotes F, Cl, Br or $C_1$–$C_4$-alkyl and if several Z radicals are substituents in one aryl radical, they may be identical or different from one another;
d denotes an integer from 0 to 4; and
f denotes an integer from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)- sulfones, dihydroxydiphenyl cycloalkanes, and α,α-bis-(hydroxyphenyl)-diisopropyl-benzenes, as well as their nuclear-alkylated compounds. These and further suitable aromatic dihydroxy compounds are described, for example, in U.S. Pat. Nos. 5,227,458; 5,105,004; 5,126,428; 5,109,076; 5,104,723; 5,086,157; 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2-bis-(4-hydroxphenyl)-propane, 2,2-bis-(3,5-dimethyl-4-hydroxyphenyl )-propane, 1,1-bis-(4-hydroxyphenyl)-cyclohexane and 1,1-bis-(4-hydroxyphenyl)-3,3,5-trimethylcyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention is phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol % (relative to the bisphenols) of polyhydroxy compounds. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxy compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ehtane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5 to 24,13 to 16, 7.5 to 13.0 and 3.5 to 6.5 g/10 min., respectively. Especially suitable are Makrolon CD 2005 and Makrolon DP1-1265, having MFR values of 60–70 and 70–90 g/10 min., respectively. These are products of Bayer Corporation of Pittsburgh, Pa.

A polycarbonate resin suitable in the practice of the invention is known and its structure and methods of preparation have been disclosed, for example, in U.S. Pat. Nos. 3,030,331; 3,169,121; 3,395,119; 3,729,447; 4,255,556; 4,260,731; 4,369,303 and 4,714,746 all of which are incorporated by reference herein.

The partial fatty acid ester useful in the context of the invention is a partial ester of a monobasic fatty acid having 10 to 22 carbon atoms with a polyhydric alcohol having 2 to 10 carbon atoms. The partial ester may be produced by esterifying the monobasic fatty acid with the polyhydric alcohol by well-known techniques; suitable partial esters are also readily available in commerce. Examples of partial fatty acid esters include those which are formed from at least one monobasic fatty acid having 10 to 22 carbon atoms such as myristic acid, palmitic acid, stearic acid, oleic acid and fatty acids of hardened fish oils and at least one polyhydric alcohol having 2 to 10 carbon atoms selected from the group consisting of ethylene glycol, glycerin and pentaerythritol. Preferred among the partial esters are the ones formed between glycerol and at least one fatty acid having 18 to 22 carbon atoms such as stearic acid, oleic acid and fatty acids (e.g., $C_{18}$ to $C_{22}$) of hardened fish oils. Glyceryl monostearate is most preferred.

The stabilizer suitable in the context of the invention is a compound, the structure of which contains at least one benzofuran-2-one group per molecule. The compound conforms structurally to

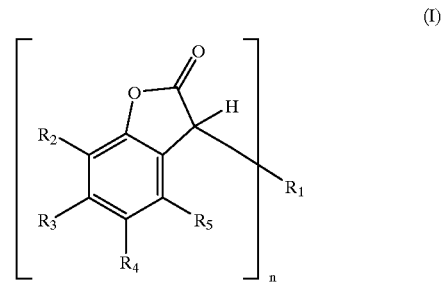

(I)

wherein in the embodiment where n is 1, $R_1$ is an unsubstituted or substituted carbocyclic or heterocyclic aromatic ring system, and where in the embodiment where n is 2, $R_1$ is unsubstituted or $C_{1-4}$-alkyl or hydroxy substituted phenylene or naphthylene, and $R_2$, $R_3$, $R_4$ and $R_5$ independently of one another are hydrogen, $C_{1-25}$-alkyl groups or phenyl.

A preferred compound is represented by 5,7-di-t-butyl-3-(3,4 dimethylphenyl)-3H-benzofuran-2-one which is depicted as:

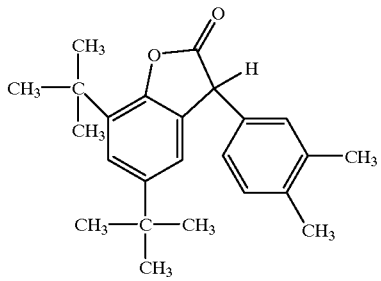

Detailed description of suitable compounds and their preparation may be found in U.S. Pat. Nos. 4,325,863, 5,175,312 and 5,607,624, which are incorporated by reference herein. A suitable compound is available in commerce from Ciba Geigy Specialty Chemicals Corporation as Irganox HP 136.

The ester is added to the polycarbonate at an amount of 0.01 to 1.0%, more preferably 0.01 to 0.5%, and the stabilizer is added at an amount of 0.01 to 0.5%, preferably 0.01 to 0.2%, relative to the weight of the composition.

The stabilized compositions of the invention may contain other conventional additives which are known for their art-recognized functions. These include dyes, flame-retardants and hydrolysis and UV stabilizers, plasticizers and mold release agents. In one preferred embodiment, the composition is suitable for making highly transparent optical storage devices.

The preparation of the stabilized compositions of the invention is conventional.

The invention is further illustrated but is not intended to be limited by the following examples in which all parts and percentages are by weight unless otherwise specified.

EXAMPLES

Stabilized compositions in accordance with the invention have been prepared and their properties determined. The polycarbonate used in all the examples shown below was a homopolycarbonate based on bisphenol A, having a melt flow rate of 75 g/10 min.; the noted additives, were as follows:

stabilizer: denotes 5,7-di-t-butyl-3-(3,4 di-methylphenyl)-3H-benzofuran-2-one ester: denotes glyceryl monostearate.

These were incorporated in the composition at the indicated levels noted as pph (parts by weight per one hundred parts of resin).

The table presented below summarizes the results of an evaluation whereby the optical properties of polycarbonate compositions containing the stabilizer and ester of the invention were compared to corresponding compositions containing but one of these additives. The results point to that the desirable combination of low yellowness index and low haze is a characteristic of the inventive composition (Example D) where both ester and stabilizer are additives.

Compositions containing but one of the additive (Examples B, C, E and F) in an amount lower than, or equal to, the amount of the combined additives, do not exhibit the desirable combination of properties. The advantageous properties attained appear to be based on a surprising and unexpected synergistic effect characterizing the inventive composition.

| Example | A | B | C | D | E | F |
|---|---|---|---|---|---|---|
| Additives | | | | | | |
| ester | 0.0 | 0.035 | 0.0 | 0.035 | 0.135 | 0.0 |
| stabilizer | 0.0 | 0.0 | 0.10 | 0.10 | 0.0 | 0.135 |
| Properties: | | | | | | |
| MFR* | 73.6 | 75 | 72.3 | 74.7 | 77.6 | 72.5 |
| optical properties** | | | | | | |
| yellowness Index | 2.1 | 2.1 | 1.3 | 0.1 | 2.1 | 0.4 |
| haze, % | 0.7 | 0.7 | 0.6 | 0.5 | 0.7 | 0.8 |
| TLT, % | 90.1 | 90.1 | 88.2 | 88.1 | 89.9 | 88.1 |

*melt flow rate measured in accordance with ASTM D-1236 @ 300° C., 1.2 kg load.
**measured on specimens 100 mils in thickness
***Total light transmission In an additional series of experiments, summarized below, the optical properties of compositions (C, D, E and R) containing 0.035 pph of glycerol monostearate and the indicated amount of stabilizer (represented by 5,7-di-t-butyl-3-(3,4-di-methylphenyl)-3H-benzofuran-2-one) were determined. Example A, control, contained polycarbonate and no additives, Example B contained glycerol monostearate and no stabilizer.

| Example | A | B | C | D | E | F |
|---|---|---|---|---|---|---|
| Stabilizer | 0.0 | 0.0 | 0.1 | 0.075 | 0.05 | 0.025 |
| optical properties** | | | | | | |
| yellowness Index | 3.2 | 2.7 | 0.4 | 0.5 | 0.3 | 0.6 |
| haze, % | 0.7 | 0.4 | 0.3 | 0.3 | 0.3 | 0.2 |
| TLT***, % | 89.5 | 90.0 | 87.8 | 88.1 | 88.4 | 89.0 |

**measured on specimens 100 mils in thickness
***Total light transmission

Athough the invention has been described in detail in the foregoing for the purpose of illustration, it is to be understood that such detail is solely for that purpose and that variation can be made therein by those skilled in the art without departing from the spirit and scope of the invention except as it may be limited by the claims.

What is claimed is:

1. A thermoplastic molding composition comprising (i) a polycarbonate resin, (ii) about 0.01 to 1.0 percent of a partial fatty acid ester of a monobasic fatty acid having 10 to 22 carbon atoms and a polyhydric alcohol having 2 to 10 carbon atoms, and (iii) about 0.01 to 0.5 percent of a stabilizer conforming to

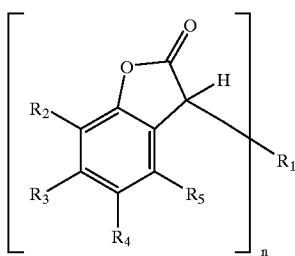

wherein in the embodiment where n is 1, $R_1$ is an unsubstituted or substituted carbocyclic or heterocyclic aromatic ring system, and where in the embodiment where n is 2, $R_1$ is unsubstituted or $C_{1-4}$-alkyl or hydroxy substituted phenylene or naphthylene, and $R_2$, $R_3$, $R_4$ and $R_5$ independently of one another are hydrogen, $C_{1-25}$-alkyl groups or phenyl, said percents being relative to the total weight of (i), (ii) and (iii).

2. The thermoplastic molding composition of claim 1 wherein said (ii) is present in an amount of 0.01 to 0.5 percent.

3. The thermoplastic molding composition of claim 1 wherein said (iii) is present in an amount of about 0.01 to 0.2 percent.

4. The thermoplastic molding composition of claim 1 wherein said (ii) is present in an amount of 0.01 to 0.5 percent and said (iii) is present in an amount of about 0.01 to 0.2 percent.

5. The thermoplastic molding composition of claim 1 wherein said (ii) is a partial fatty acid ester derived from glycerol and at least one $C_{18-22}$-fatty acid.

6. The thermoplastic molding composition of claim 1 wherein said (ii) is glycerol monostearate.

7. The thermoplastic molding composition of claim 1 wherein said (iii) is 5,7-di-t-butyl-3-(3,4-di-methylphenyl)-3H-benzofuran-2-one.

8. A thermoplastic molding composition comprising
 (i) a polycarbonate resin,
 (ii) about 0.01 to 1.0 percent of glycerol monostearate and
 (iii) about 0.01 to 0.5 percent of 5,7-di-t-butyl-3-(3,4 dimethylphenyl)-3H-benzofuran-2-one.

9. The thermoplastic molding composition of claim 8 wherein said (ii) is present in an amount of 0.01 to 0.5 percent and said (iii) is present in an amount of about 0.01 to 0.2 percent.

* * * * *